(12) United States Patent
Bai

(10) Patent No.: US 10,756,982 B2
(45) Date of Patent: Aug. 25, 2020

(54) MACHINE LEARNING MICROSERVICE ARCHITECTURE DESIGN TOOLS AND METHODS

(71) Applicant: Microsoft Technology Licensing, LLC, Redmond, WA (US)

(72) Inventor: Haishi Bai, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 15/982,243

(22) Filed: May 17, 2018

(65) Prior Publication Data

US 2019/0356555 A1 Nov. 21, 2019

(51) Int. Cl.
*G06F 15/173* (2006.01)
*H04L 12/24* (2006.01)

(52) U.S. Cl.
CPC .......... *H04L 41/145* (2013.01); *H04L 41/142* (2013.01); *H04L 41/16* (2013.01)

(58) Field of Classification Search
CPC ..... H04L 67/34; H04L 41/5051; H04L 67/10; H04L 67/32; H04L 67/42
USPC ................. 709/223, 246, 204, 205
See application file for complete search history.

(56) References Cited

PUBLICATIONS

"Azure Quickstart Templates", Retrieved from: https://azure.microsoft.com/en-us/resources/templates/, Retrieved Date: Aug. 24, 2017, 11 Pages.

"Sample Templates", Retrieved from: http://docs.aws.amazon.com/AWSCloudFormation/latest/UserGuide/cfn-sample-templates.html, Retrieved Date: Aug. 24, 2017, 3 Pages.

Binz, Tobias et al., "Formalizing the Cloud through Enterprise Topology Graphs", In Proceedings of IEEE 5th International Conference on Cloud Computing, Jun. 24, 2012, DOI: 10.1109/CLOUD.2012.143, (pp. 742-749, 8 total pages).

Huan, Jun et al., "Efficient Mining of Frequent Subgraphs in the Presence of Isomorphism", In Proceedings of Third IEEE International Conference on Data Mining, Nov. 2003, 4 Pages.

Inokuchi, Akihiro et al., "A General Framework for Mining Frequent Subgraphs from Labeled Graphs", In Journal of Fundamenta Informaticae, vol. 66, Issue 1-2, Jan. 1, 2005, (pp. 53-82, 30 total pages).

(Continued)

*Primary Examiner* — Lan Dai T Truong

(74) *Attorney, Agent, or Firm* — Buckley, Maschoff & Talwalkar LLC

(57) ABSTRACT

According to some embodiments, a machine learning architecture design platform may access a microservice architecture design data store that contains existing microservice architecture designs, and a graphic abstraction computing component may automatically create existing graph models of the existing designs. A pattern recognition computing component may then execute a machine learning algorithm to access the existing graph models and automatically detect existing design patterns. A designer interface computing component may interactively and iteratively exchange information with a designer, including receipt of at least one design requirement from the designer. Based on the at least one received design requirement and the automatically detected existing design patterns, a dynamic recommendation computing component may automatically construct a recommended microservice architecture for the cloud computing environment. In some embodiments, a quality assessment computing component may evaluate a potential microservice architecture design.

20 Claims, 19 Drawing Sheets

(56) References Cited

PUBLICATIONS

Kuramochi, Michihiro et al., "An Efficient Algorithm for Discovering Frequent Subgraphs", In Journal of IEEE Transactions on Knowledge and Data Engineering, vol. 16, Issue 9, Sep. 2004, (pp. 1038-1051, 14 total pages).
Schwanke, Robert W., "An Intelligent Tool for Re-engineering Software Modularity", In Proceedings of the 13th International Conference on Software Engineering, May 13, 1991, (pp. 83-92, 10 total pages).
Hutchens, David H. et al., "System Structure Analysis: Clustering with Data Bindings", In Journal of IEEE Transactions on Software Engineering—Annals of discrete mathematics, vol. 11 Issue 8, Aug. 1985, (pp. 749-757, 9 total pages).

| RECOMMENDATION IDENTIFIER 1902 | DESIGNER IDENTIFIER 1904 | GRAPH MODEL IDENTIFIER 1906 | DESIGN REQUIREMENT(S) 1908 | RECOMMENDATION 1910 |
|---|---|---|---|---|
| R_1001 | D_101 | G_101 | | |
| R_1002 | D_101 | G_123 | | |

MACHINE LEARNING MICROSERVICE ARCHITECTURE DESIGN TOOLS AND METHODS

BACKGROUND

Could-based data centers may be employed by an enterprise in a variety of settings for running service applications and maintaining data for business and operational functions. For example, a data center within a networked system may support operation of a variety of differing service applications (e.g., web applications, email services, and search engine services). These types of functions may be implemented using a "microservice" architecture. As used herein, the term "microservice" may refer to, for example, a Service-Oriented Architecture ("SOA") that structures an application as a collection of relatively fine-grained services. By decomposing an application into an architecture having different smaller services, modularity may be improved the application may be easier to understand, develop, and test. A solid architecture may be important to any software solution implemented with microservices. Note that different cloud computing environments, computing platforms, and microservices may be associated with different properties and abilities. A good microservice architect or designer may need business expertise, platform knowledge, creativity as well as rich coding experience to be successful. Manually creating an efficient and accurate architecture, however, can be a time-consuming, costly, and error-prone task—especially when there are a substantial number of microservices and/or complex functionality is required.

What is needed is a system to accurately and efficiently improve microservice architecture design.

BRIEF DESCRIPTION OF THE DRAWINGS

FIG. 19 is tabular portion of a recommended design database according to some embodiments.

DETAILED DESCRIPTION

The following description is provided to enable any person in the art to make and use the described embodiments. Various modifications, however, will remain readily apparent to those in the art.

Figure 1:
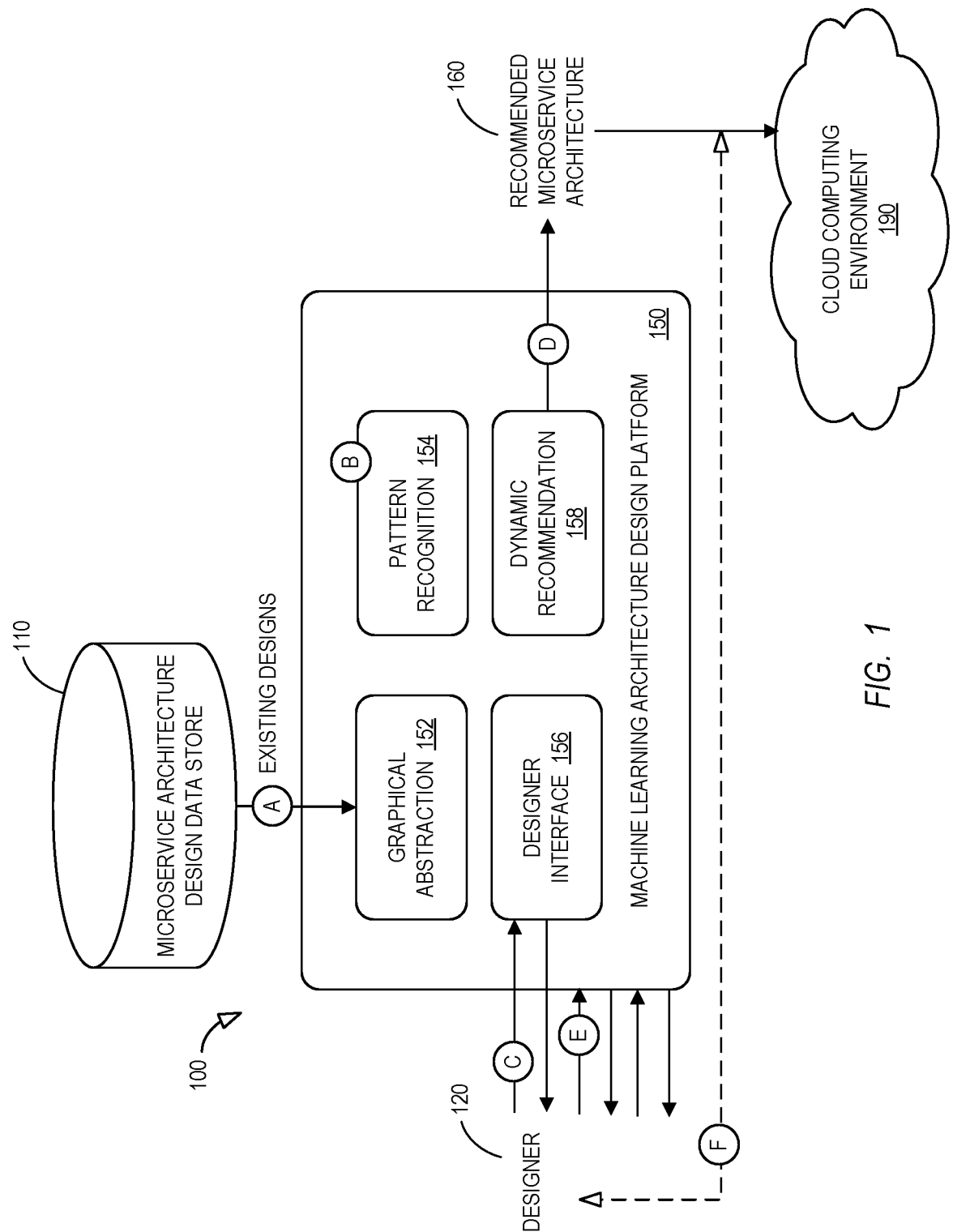
FIG. 1 is a high-level block diagram of a system associated with a cloud computing environment.

Generally, some embodiments provide systems and methods to accurately and efficiently improve microservice architecture design. For example, FIG. 1 is a high-level architecture of a system 100 in accordance with some embodiments. The system 100 may be associated with a cloud computing environment 190 adapted to run microservices. A machine learning architecture design platform 150 may access existing designs from a microservice architecture design data store 110 at (A). As used here, the phrase "machine learning" may refer to any approach that uses statistical techniques to give computer systems the ability to learn (i.e., progressively improve performance of a specific task) with data without being explicitly programmed. Examples of machine learning may include decision tree learning, association rule learning, artificial neural networks deep learning, inductive logic programming, Support Vector Machines ("SVM"), clustering, Bayesian networks, reinforcement learning, representation learning, similarity and metric learning, sparse dictionary learning, genetic algorithms, rule-based machine learning, learning classifier systems, etc.

A graphical abstraction computing component 152 may convert the existing designs into graphs, and a pattern recognition computing component may detect patterns in those graphs at (B). At (C), a designer 120 may provide a design requirement to the machine learning architecture design platform 150 via a designer interface computing component 156. A dynamic recommendation computing component 158 may then generate a recommended microservice architecture 160 for the designer 120 at (D). According to some embodiments, the design process may be interactive and iterative at (E) such that the designer 120 and tool can work together to refine the architecture. Note that at various stages the designer 120 might review and/or adjust the recommended microservice architecture 160 at (F) (as illustrated by the dashed arrow in FIG. 1) or deploy the architecture to the cloud computing environment 190.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The machine learning architecture design platform 150 may store information into and/or retrieve information from various data sources, such as the microservice architecture design data store 110. The various data sources may be locally stored or reside remote from the machine learning architecture design platform 150. Although a single machine learning architecture design platform 150 is shown in FIG. 1, any number of such devices may be included. Moreover, various devices described herein might be combined according to embodiments of the present invention. For example, in some embodiments, the microservice architecture design data store 110 and machine learning architecture design platform 150 might comprise a single apparatus. The microservice architecture design data store 110 and/or machine learning architecture design platform 150 functions may be performed by a constellation of networked apparatuses in a distributed processing or cloud-based architecture.

The designer might directly access the system 100 via remote computing devices such as a Personal Computer ("PC"), tablet, smartphone, or remotely access the system 100 through a gateway connection to view information about and/or manage system 100 operation in accordance with any of the embodiments described herein. In some cases, an interactive graphical display interface may let a user define and/or adjust certain parameters (e.g., links between microservices) and/or provide or receive automatically generated recommendations or results from the machine learning architecture design platform 150.

Figure 2:
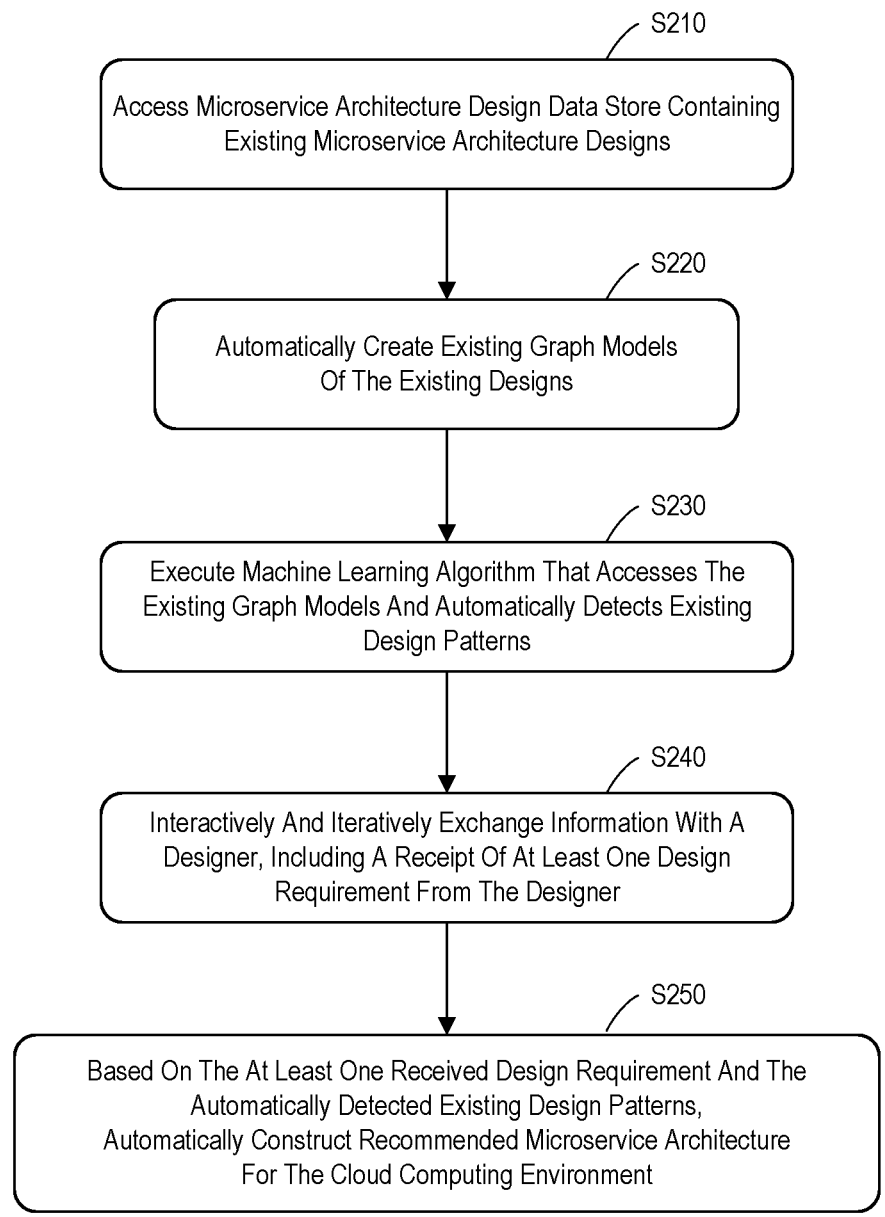
FIG. 2 is a flow diagram of a process in accordance with some embodiments.

FIG. 2 is a flow diagram of a process to improve microservice architecture design in accordance with some embodiments. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a machine learning architecture design platform may access at least one microservice architecture design data store containing existing microservice architecture designs. The machine learning architecture design platform might utilize, for example, a public design data store, a data store associated with a particular designer (e.g., containing his or her prior designs), a data store associated with other designers, a data store associated with a particular cloud computing environment, a data store associated with different cloud computing environments, an architecture requirements data store, a platform-specific knowledge data store, a library of design templates, textual design descriptions, etc.

At S220, a graphic abstraction computing component may automatically create existing "graph models" of the existing designs. As described with respect to FIGS. 3 through 6, each existing graph model might comprise an Enterprise Topography Graph ("ETG"). According to some embodiments, the graphic abstraction computing component may execute: a process to automatically acquire knowledge by crawling a plurality of data stores, a process utilizing a horizontal-scale property, a process utilizing a vertical-scale property, a process utilizing a state-feature property, a process utilizing a proxy property, a process utilizing a communication pattern property, a graph generalization process, a graph specialization process, a graph substitution process, a graph acquisition process, etc.

At S230, a pattern recognition computing component may execute a machine learning algorithm that accesses the existing graph models and automatically detects existing design patterns. For example, the pattern recognition computing component execute a process to identify efficient patterns and/or a process to identify inefficient anti-patterns.

At S240, a designer interface computing component may interactively and iteratively exchange information with a designer. The exchange may include a receipt of at least one design requirement from the designer. According to some embodiments, the designer interface computing component may exchange information with the designer via a natural language interface, a virtual expert, a chat bot, voice recognition, a video stream, etc.

Based on the at least one received design requirement and the automatically detected existing design patterns, at S250 a dynamic recommendation computing component may "automatically" construct a recommended microservice architecture for the cloud computing environment. As used herein, the term "automatically" may refer to a process that may be performed with little or no human intervention. According to some embodiments, the dynamic recommendation computing component automatically constructs a series of recommended microservice design patterns for the designer. A quality assessment computing component of the machine learning architecture design platform might evaluate a potential microservice architecture design via a Quality of Service ("QoS") merit analysis, a modulization analysis, a robustness analysis, a scalability analysis, a single-point-of-failure analysis, etc. According to some embodiments, the quality assessment computing component might further evaluate a currently deployed microservice architecture design (e.g., to recommend improvements). After analysis, the machine learning architecture designer platform may transmit a deployable package associated with a microservice architecture design to the designer.

Thus, embodiments may provide an interactive system that guides software architects to a successful microservice architectures by leveraging machine-learned patterns and best practices. Embodiments may bridge silos of knowledge such as requirements, patterns and practices and platform-specific knowledge, and present an intuitive conversational interface for architects to describe requirements, to discover platform capabilities and proven patterns, and to iterate their designs through interactive sessions. Some embodiments also provide quantitative assessments on architecture qualities. As a result, the system may help architects to continuously improve their architectures, avoid architecture erosions, and adapt a system to new requirements. Moreover, embodiments may formally incorporate Artificial Intelligence ("AI") as an integral part of a software design process. As the complicity of cloud platform increases, will be increasingly important to provide a guided experience that incorporates discovery and learning as an iterative process to help software architects navigate through a massive and ever-changing technology landscape.

Note that systems described herein may help architects discover new platform capabilities so that they can make better informed decisions. When traditional enterprises make a transition to cloud, their architects need to learn a tremendous amount of new knowledge about the platform to fully understand its capabilities and limitations. Based on both functional and non-functional requirements, embodiments described herein may make intelligent recommendations on viable solutions that may be totally unknown by the architects.

In addition, embodiments may help guide architects to apply proven design patterns and avoid anti-patterns. Although the software industry has accumulated abundant design patterns and best practices over the years, these patterns exist mostly in text formats that can't be directly applied. Embodiments described herein may automatically learn about design patterns by mining existing successful solutions and abstracting the architectures into searchable and applicable graphs.

Further, embodiments may bring natural language conversation into the design process. Iterative design has been proven to be an effective software design process. Some embodiments described herein may allow architects to work with a virtual expert that helps them to assess the quality of their designs, suggests fresh design choices, and proposes possible improvements, all through natural language conversations. The system may then capture the resulting architecture and use it to create a deployable package that can be directly applied to cloud. According to some embodiments, architects can also point the system to an existing deployment and the tool can help them to make continuous improvements to existing architectures.

Note that microservice applications on a cloud may provide a nice abstraction over software component details so that the system can focus on Quality of Service ("QoS") merits, which is a key to a successful microservice application. Working at a higher abstraction level also allows the system to be agnostic with respect to specific programming languages, frameworks, and platforms. Note that embodiments may make intelligent recommendations with little prior knowledge about the underlying technologies. In this way, a stable, verifiable system may be automatically designed using identified components. Some embodiments utilize dynamic knowledge acquisition and application. That is, the system might not be equipped with pre-populated knowledge about architectures, patterns, and best practices. Instead, the tool may design a sub-system that automatically acquires knowledge by crawling selected sources.

Figure 3:
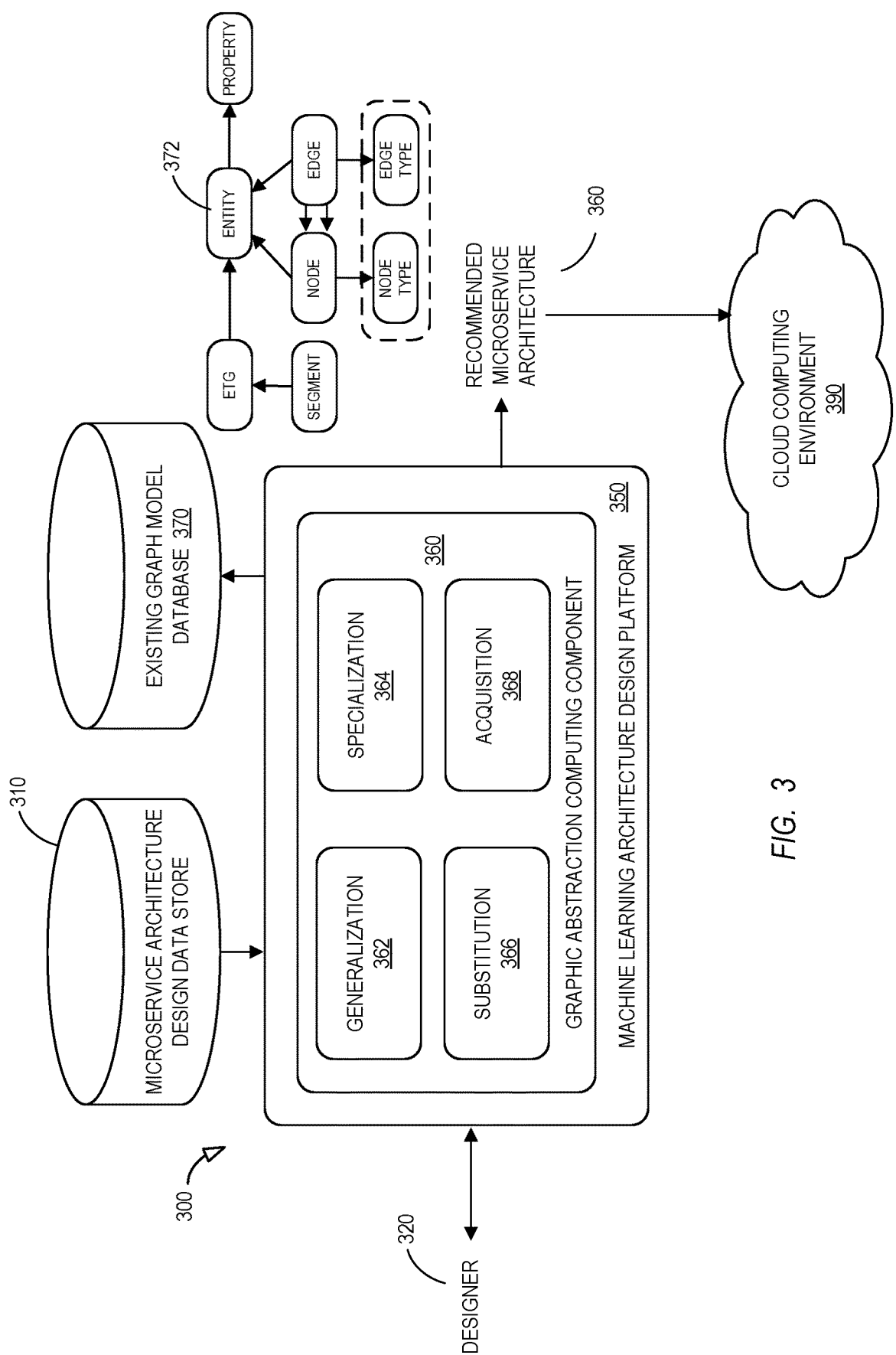
FIG. 3 is a high-level block diagram of an architectural model creation system associated with a cloud computing environment according to some embodiments.

FIG. 3 is a high-level block diagram of an architectural model creation system 300 associated with a cloud computing environment 390 according to some embodiments. As before, a machine learning architecture platform 350 may access a microservice architecture design data store 310, receive input from a designer 320, and generate a recommended microservice architecture 360. According to this embodiment, the machine learning architecture design platform 350 includes a graphic abstraction computing component 360 including generalization 362, specialization 360, substitution n 366, and acquisition 360 that may generate a graph model 372 that can be stored into an existing graph model database 370.

Figure 4:
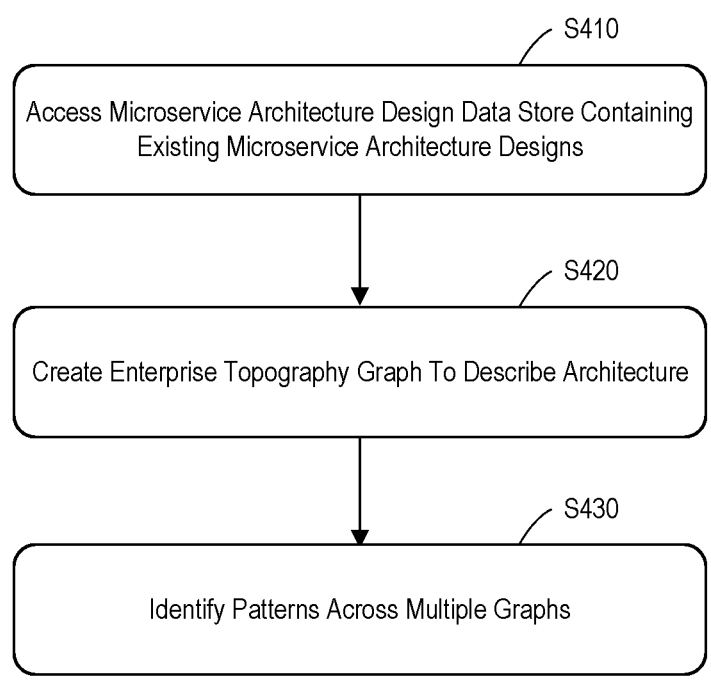
FIG. 4 is a flow diagram of an architectural model creation process in accordance with some embodiments.
Figure 5:
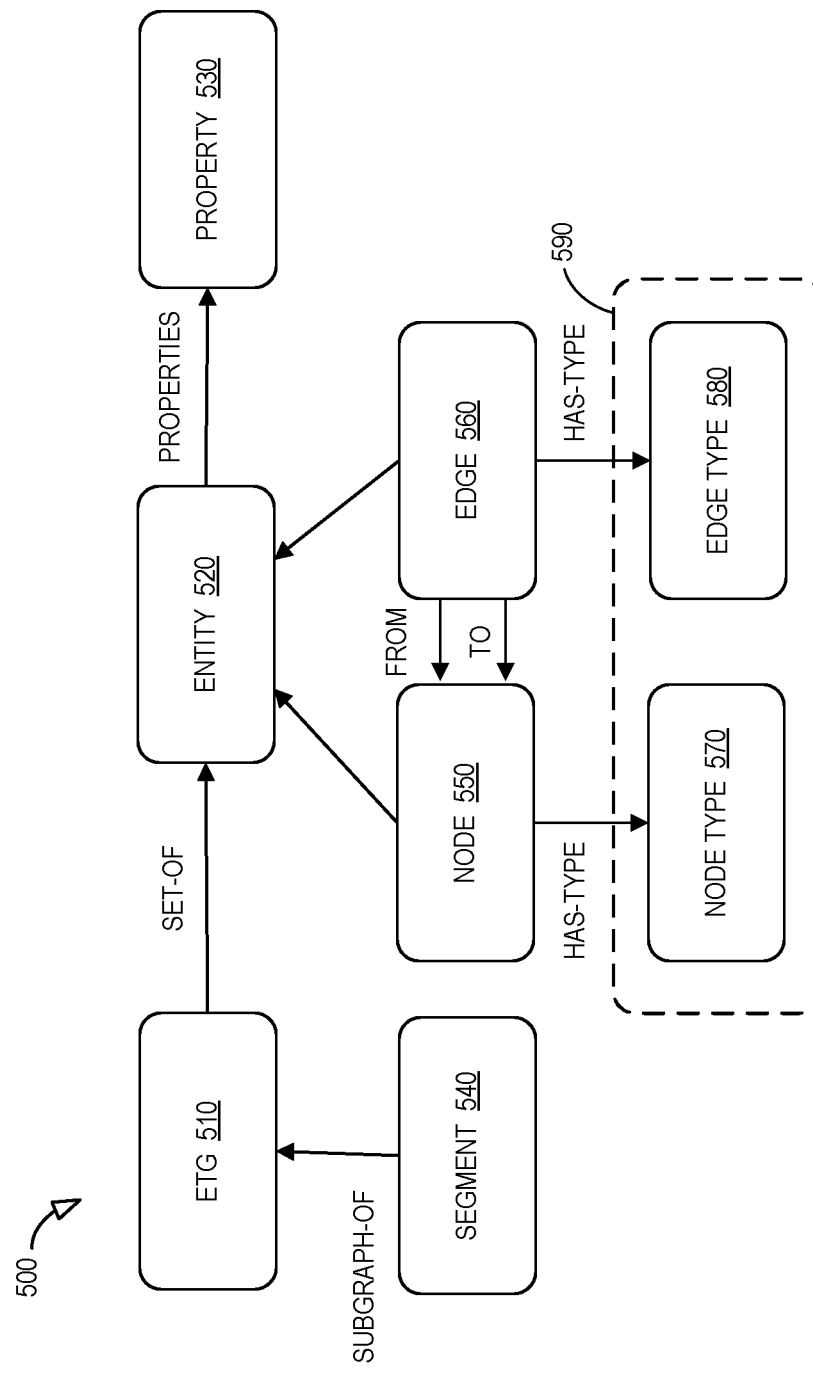
FIG. 5 is a conceptual model of an enterprise topology graph according to some embodiments.

FIG. 4 is a flow diagram of an architectural model creation process in accordance with some embodiments. At 410, the system may access a microservice architecture design data store containing existing microservice architecture designs. At 420, the system may the create an ETG to describe each existing architecture which can be used to identify patterns across multiple graphs at S430. FIG. 5 is a conceptual model 500 of an ETG 510 including an entity 520, aa property 530, and a segment 540. The entity 520 may be associated with a node 550 and edge 560 (associated with a node type 570 and edge type 580, respectively). In this way, the model 500 may be used to describe a microservice architecture. The ETG approach may provide an appropriate abstraction level that fits with microservice applications. For example, the model 500 may adopt the following: (1) both node 55- and edge 560 are modeled as graph nodes, and (2) both node type 570 and edge type 590 are defined as a global tree structure 590.

A node type tree may be similar to what is defined in ETG, with the following formal constraints: (1) all siblings under a given node 550 may be functionally equivalent and can generally be presented as alternatives to each other (e.g., MySQL and PostgreSQL under the same RDBM node may be considered equivalent); (2) a node 550 may appear at multiple places in the node type tree (e.g., a Virtual Machine ("VM") may appear under both a ContainerHost node and a Host node); and (3) a leaf node may map directly to a deployable resource on the cloud, including an individual resource or a resource group.

An entity 520 can have any number of associated properties, including:

A "horizontal-scale" property: indicate if the entity is a singleton, or can be scaled to 10s, 100s, or 1000s of instances.

A "vertical-scale" property: indicates the maximum times of capacity can be reached comparing to the default configuration.

A "state-feature" property: describes how the entity manage state. Possible values are: stateless, stateful-no-replication, stateful-local-replication, stateful-zone-replication, stateful-geo-replication.

A "proxy" property: indicates if the entity is used as a proxy for service calls. For example, a load balancer is marked as a proxy as it passes traffic to downstream entities to be processed.

A "communication-pattern" property: indicates if the edge node represents a synchronous communication channel or an asynchronous communication channel.

Edge type tree may also contain three top-level nodes: "hosted-on" that defines a binding between a service instance and its host, "depends-on" that defines cross-service dependencies, and "communicates-with" that defines cross-service communication.

Figure 6:
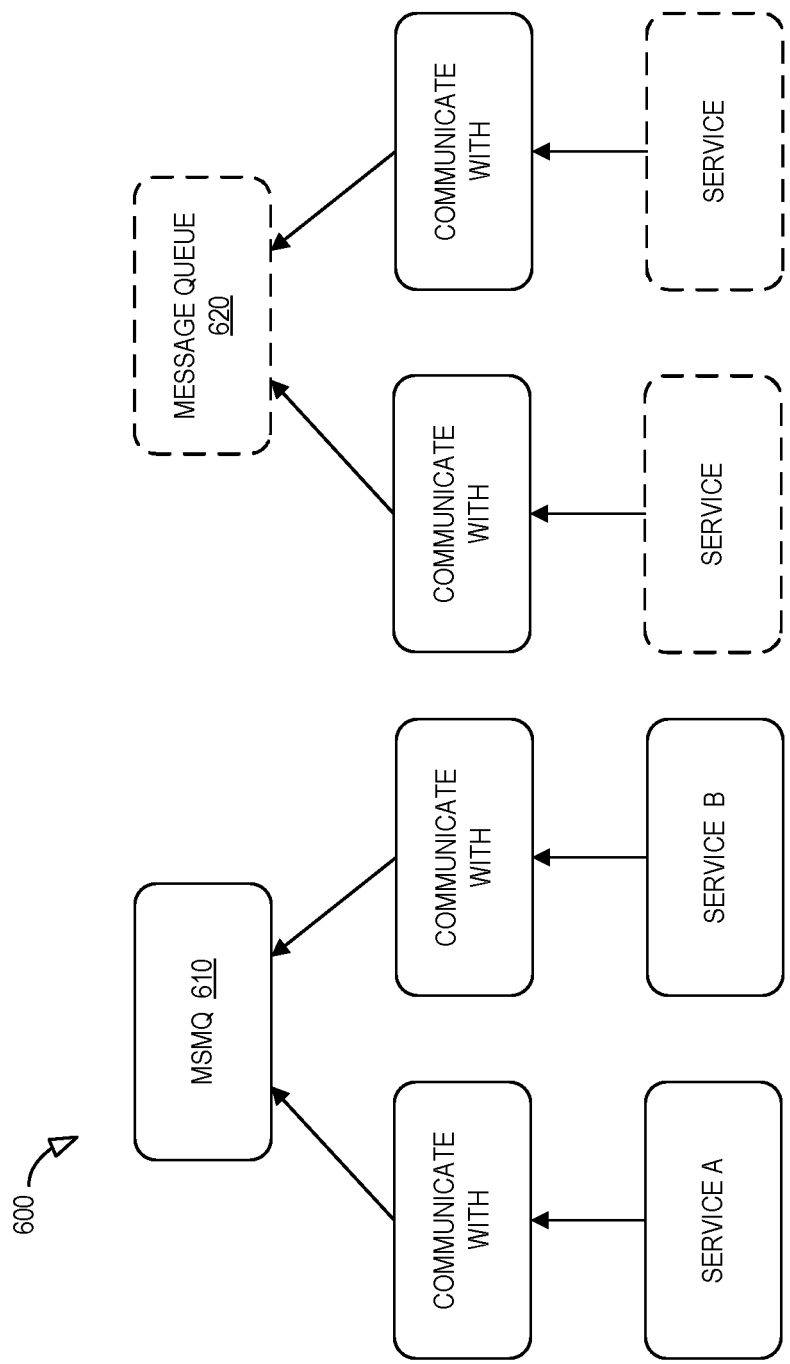
FIG. 6 illustrates a process utilizing a generalization in accordance with some embodiments.

On top of ETG, embodiments may define the concept of a design pattern: a design pattern is a maximum common segment, or a legal variance of the segment, across multiple application graphs. Referring again to FIG. 3, the system 300 may define the following types of variances:

The generalization 362 of a graph segment S(V, E) is a new graph segment S'(V', E) by replacing any number of vertices in V with their ancestors. The generalization 362 may be called a "level-n generalization" where n is the maximum number of levels that are traced back along the node type tree during such substitutions. FIG. 6 illustrates 600 a process utilizing a generalization 362 in accordance with some embodiments along a (partially displayed) node type tree. From the Microsoft Message Queue ("MSQM") 620 to message queue 620, two generalizations occurred: (1) "MSQM" is replaced by "Message Queue" by a level-1 generalization; and (2) both "Service A" and "Service B" are replaced by "Service" through another multi-level generalization.

The specialization 364 goes down the node type tree: a specialization of a graph segment S(V, E) is a new graph segment S'(V', E) by replacing any number of vertices in V with their descendants. The substitution 366 of a graph segment S(V, E) is a new graph segment S'(V', E) by replacing any number of vertices in V with their siblings. The acquisition 360 may be associated with an entity that can acquire desired properties through proxies. For example, a VM entity with horizontal-scale property 1 can acquire horizontal scale capability by attaching to a load balancer entity, which has proxy property set to true and horizontal-scale set to 100.

Figure 7:
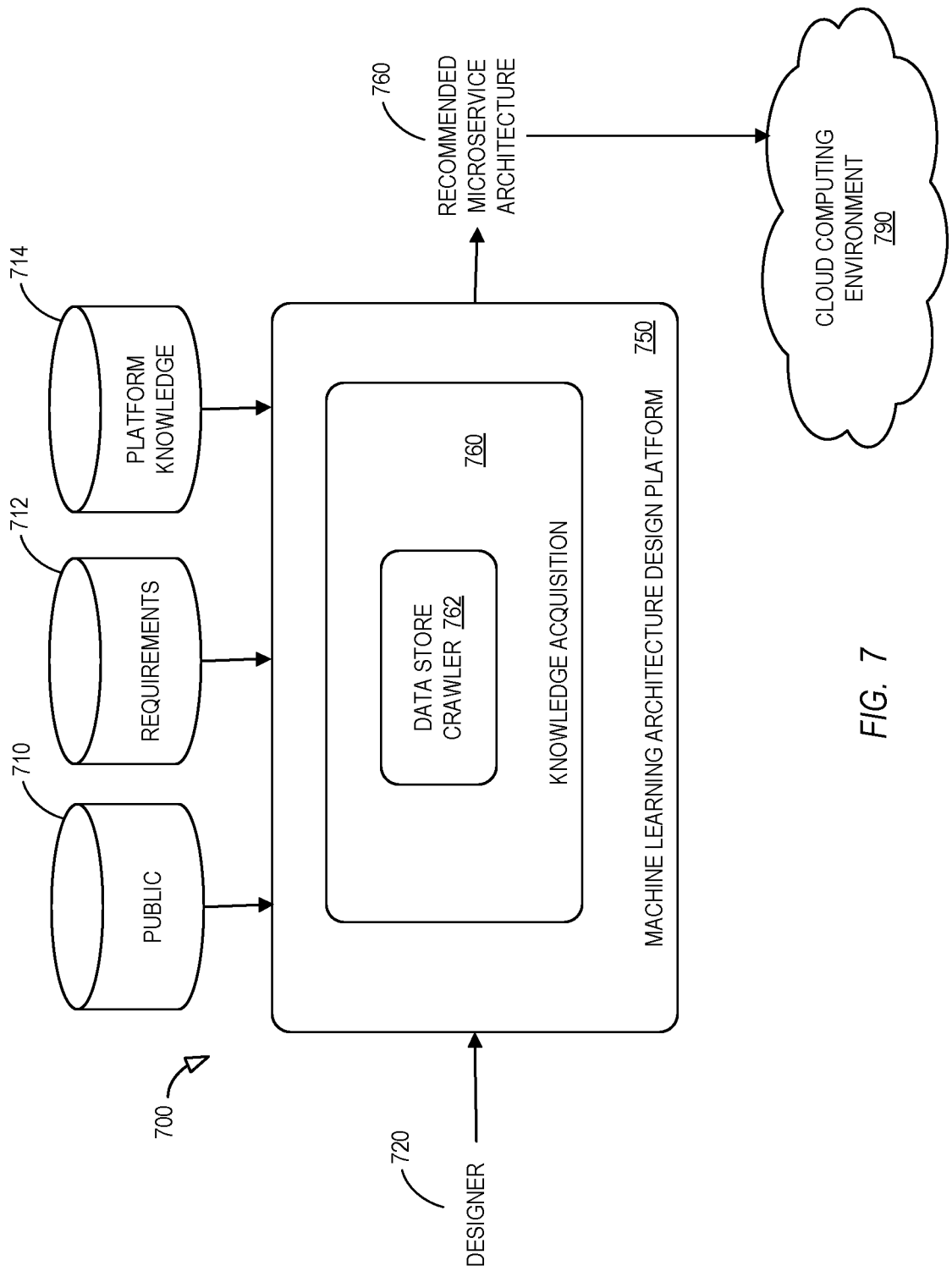
FIG. 7 is a high-level block diagram of a knowledge acquisition system associated with a cloud computing environment according to some embodiments.
Figure 8:
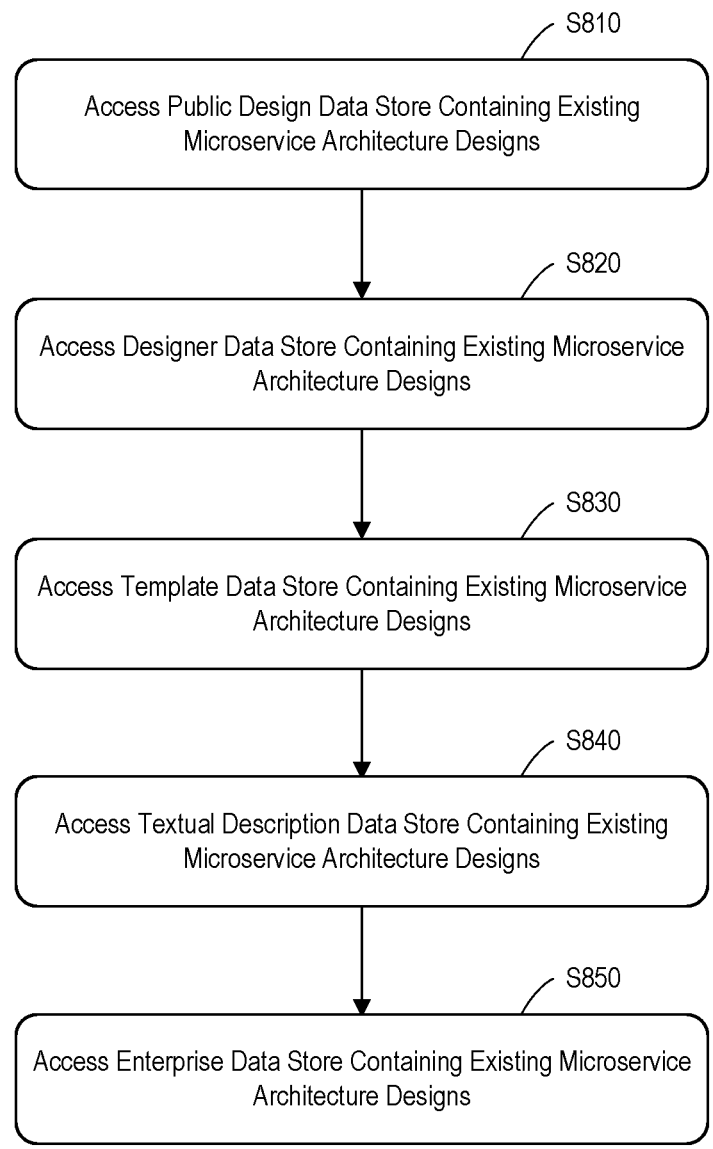
FIG. 8 is a flow diagram of a knowledge acquisition process in accordance with some embodiments.

FIG. 7 is a high-level block diagram of a knowledge acquisition system 700 associated with a cloud computing environment 790 according to some embodiments. As before, a machine learning architecture platform 750 may access data stores, receive input from a designer 720, and generate a recommended microservice architecture 760. In this case, a knowledge acquisition component 760 may include a data store crawler 760 that can retrieve data from a public data store 710, a requirements data store 712, a platform knowledge data store 714, etc. in an automated fashion. FIG. 8 is a flow diagram of a knowledge acquisition process in accordance with some embodiments. At S810, the system may access a public design data store containing existing microservice architecture designs. At S820, the system may access a designer design data store containing existing microservice architecture designs. At S830, the system may access a template data store containing existing microservice architecture designs. At S410, the system may access a textual description data store containing existing microservice architecture designs. At S850, the system may access an enterprise design data store containing existing microservice architecture designs.

In this way, just like a human architect, the system may learn about architecture patterns and best practices by examining existing designs. First, the system may convert existing architectures to graphs. Then, the system may search for common patterns across these graphs and apply them in new designs when appropriate.

A cloud platform may provide templating languages that describe resource topologies, such as the CloudFormation template, the ARM template and OpenStack Heat. Moreover, some platforms may provide curated galleries of reference templates for typical scenarios. These template galleries may provide hundreds of predefined scenarios from which the system can extract knowledge from. The tool may continuously crawl these galleries and covers the templates into searchable graphics as a knowledge base. Then, the system may apply transformations (e.g., generalization, specialization, and substitution) to extract reusable design patterns.

Choosing cloud templates as a learning source may bring additional benefits: (1) the architects can instruct the system to learn from their own set of templates so that the system will acquire additional insights into their design styles and implementation habits (and the system can facture these factors into designs so that the resulting architecture is familiar to the specific team, boosting overall productivity); (2) when generating outputs, the system may reverse the crawler logic to produce cloud templates that can be directly deployed without further conversions, avoiding potential misunderstandings across teams; and (3) architects can point the system to existing deployments to periodically review the existing architectures and reduce architecture erosion over time.

Figure 9:
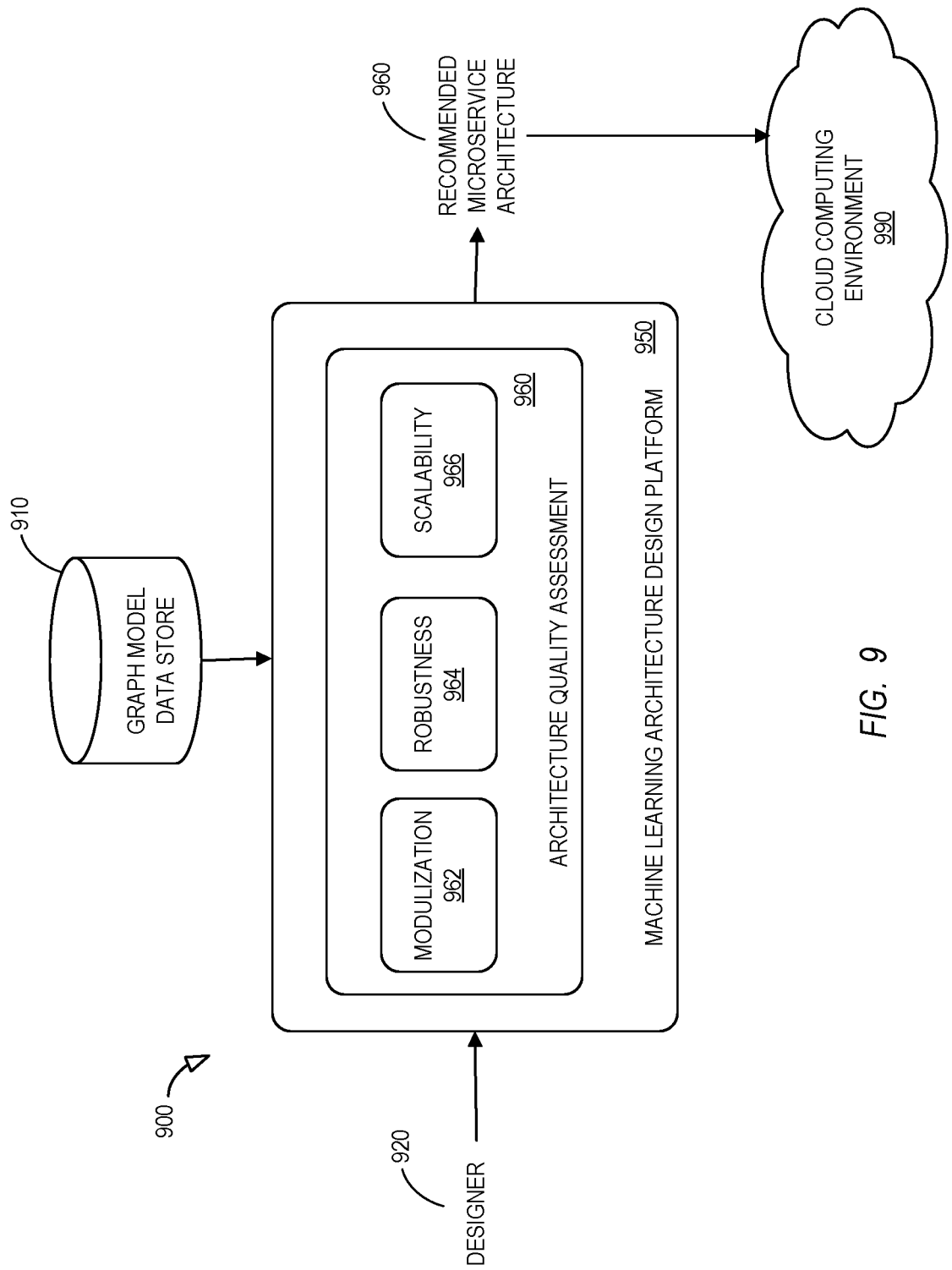
FIG. 9 is a high-level block diagram of a quality assessment system associated with a cloud computing environment according to some embodiments.
Figure 10:
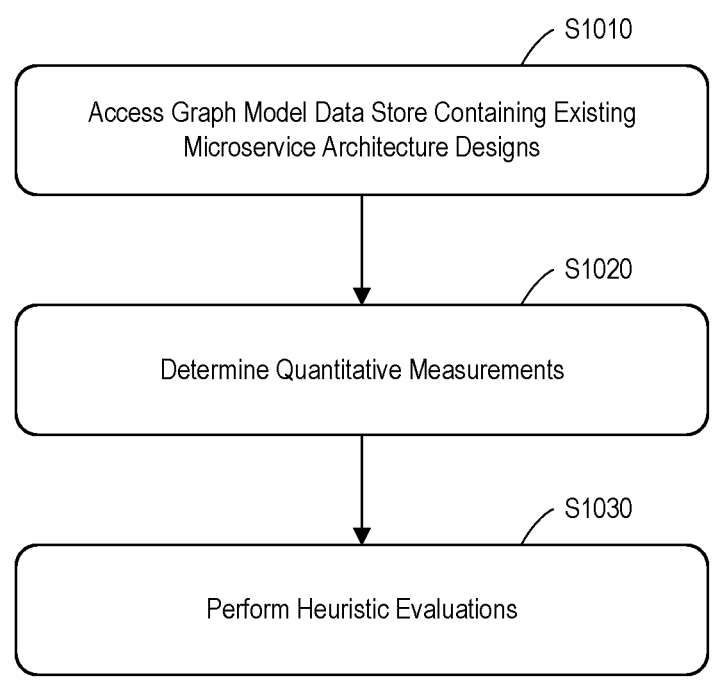
FIG. 10 is a flow diagram of a quality assessment process in accordance with some embodiments.

FIG. 9 is a high-level block diagram of a quality assessment system 900 associated with a cloud computing environment 990 according to some embodiments. As before, a machine learning architecture platform 950 may access a graph model data store, receive input from a designer 920, and generate a recommended microservice architecture 960. An architecture quality assessment 960 may include processes associated with modulization 962, robustness 964, and scalability 966. FIG. 10 is a flow diagram of a quality assessment process in accordance with some embodiments. At 1010, the system may access a graph model data store that contains existing microservice architecture designs. The system may then determine quantitative measurements at S1010 and perform heuristic evaluations at S1030.

In this way, the system 900 may run automated architecture assessments throughout the design process. These assessments may provide quantitative measurements as well as heuristic evaluations of the system to keep the architect on the right track. Without automated assessments, an architect may fall into a wrong path and make a series of bad design decisions, which will be much costlier to fix at a later stage as compared to fixing them right away.

With respect to the modulization 962, note that a well-designed microservice application may have high cohesion and loose coupling among its services. The system 900 may measures level of cohesion by analyzing the system topology. Specifically, the system 900 may examine incoming depends-on links to an entity. If the links are originated from node types that reside in different branches, it is evidence that the entity in question demonstrates incidental cohesion by taking on unrelated responsibilities. This method might apply at a services level but not at a lower granularity (because many cross-cutting components may demonstrate such topology).

Since services in a microservice application are supposed to be self-sufficient, the architecture graph should have fewer depends-on edges. Hence, the system 900 may define the modularity of an architecture as a ratio between number of depends-on edges and total number of vertices:

$$M = \frac{|E_{depends-on}|}{|V|}$$

A lower M means better modularity. Also, because vertices linked by depends-on edges should form a simple graph, M should be smaller than 1. This is, $M \geq 1$ may indicate that a circular reference exists.

Thus, the system 900 considers depends-on a tight coupling (by topology). Moreover, the system 900 may detect coupling-by-data by looking for patterns where two or more entities depend on an entity with state-feature property set to non-stateless values. Moreover, the system 900 may consider a communicate-with connection as tight coupling (by function) if its communication-pattern property is synchronous. Otherwise, the connection may be considered loosely coupled.

To evaluate scalability 966, the system 900 may first cut the architecture diagram into smaller subgraphs, each representing a scaling unit. The subgraph is a maximal subgraph connected only by depends-on edges. Then, the system 900 may assess the scalability of each scaling unit by examining the horizontal-scale property ("hs") and the vertical-scale property ("vs"). The scalability of a scaling unit $S_g(V_g, E_g)$ is defined as:

$S_g = \min(hs_j, vs_j)$ wherein entity $v_i \in V_g$

This value reflects the maximum times of original capacity the unit can reach. $S_g = 1$ may indicate a unit that can't be scaled.

Figure 12:
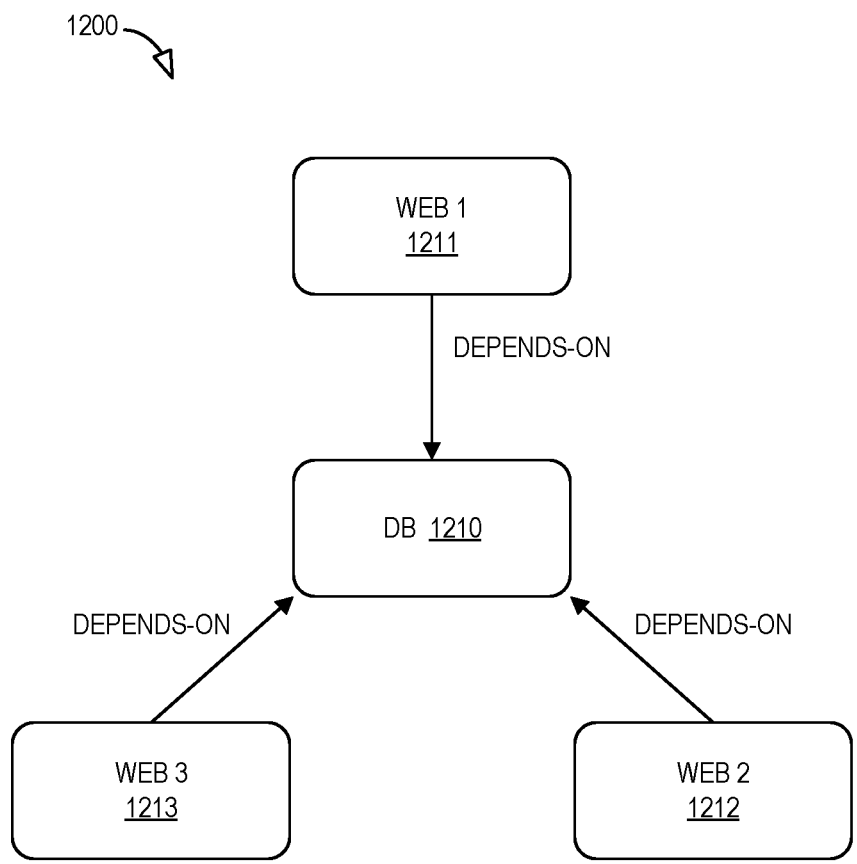
FIG. 12 illustrates a single-point-of-failure graph segment in accordance with some embodiments.

With respect to robustness 964, the system 900 may apply graph theory to different segments or entire architecture graph to identify patterns and anti-patterns in the design. For example, a star in an architecture graph may suggest a single point of failure. FIG. 12 illustrates 1200 a single-point-of-failure graph segment 1200 in accordance with some embodiments. In particular, failure of a database 1210 may adversely impact web 1 1211, web 2, 1212, and web 3, 1213. To identify an instance of such an anti-pattern, system 900 may search for a star graph segment $Sk(V_1, V_2, E)$ such that $|V_1|=1$, $|V_2|>1$, and for every two vertices $v_1 \in V_1$ and $v_2 \in V_2$ is an edge $e \in E$. Furthermore, the system 900 can use ratio $|V_2|/|V_1|$ to measure severity of an anti-pattern instance (because a larger ratio indicates more components relying on a single potential point of failure).

Figure 11:
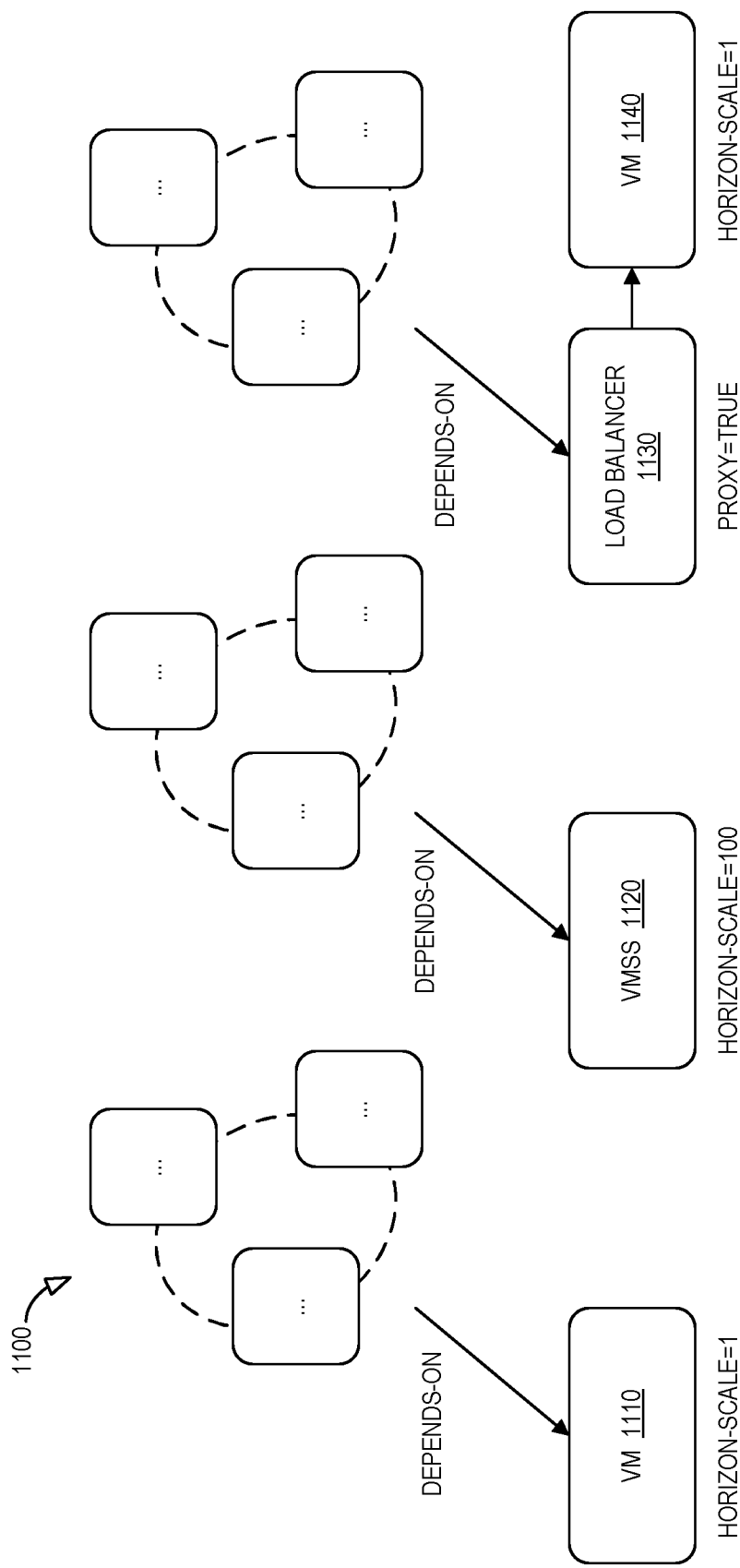
FIG. 11 illustrates scalability improvements according to some embodiments.

Embodiments described herein may use a series of strategies to generate recommendations to improve existing architecture. Because all strategies are expressed as graph functions, the system can be dynamically extended and customized to utilize different sets of such functions. For example, for scaling units with low $S_g$ values, the system may attempt to improve the entity with minimum scalability property by searching for a compatible replacement or a proxy with higher scalability characteristics. If a replacement is found, the entity may be replaced by a substitution. If a proxy is found, the proxy may be introduced into the graph through acquisition. For example, FIG. 11 illustrates 11 scalability improvements according to some embodiments. In this scenario, the system may recommend replacing a VM 1110 entity in the original architecture to a scalable VM Scale Set ("VMSS") 1120 or introducing a load balancer 1130 in front of the VM entity 1140.

In architecture evaluations, minimal coupling and maximal cohesion are well-regarded as two key characteristics of a well-designed modularized system. As described herein, a system may focus only on distinguishing functional cohesion from coincidental cohesion while ignoring other cohesion types that reflect more on the service internal quality (instead of impacting on the overall architecture). Some embodiments may assess module cohesion by examining the module code at class level by clustering analysis or other quantitative analysis methods. Other embodiments may use a different approach at a higher level—the system may infer service cohesion and coupling by analyzing service deployment topology. Working at a higher level may allow the system to work with microservice applications implemented in various kinds of programming languages and frameworks.

Figure 13:
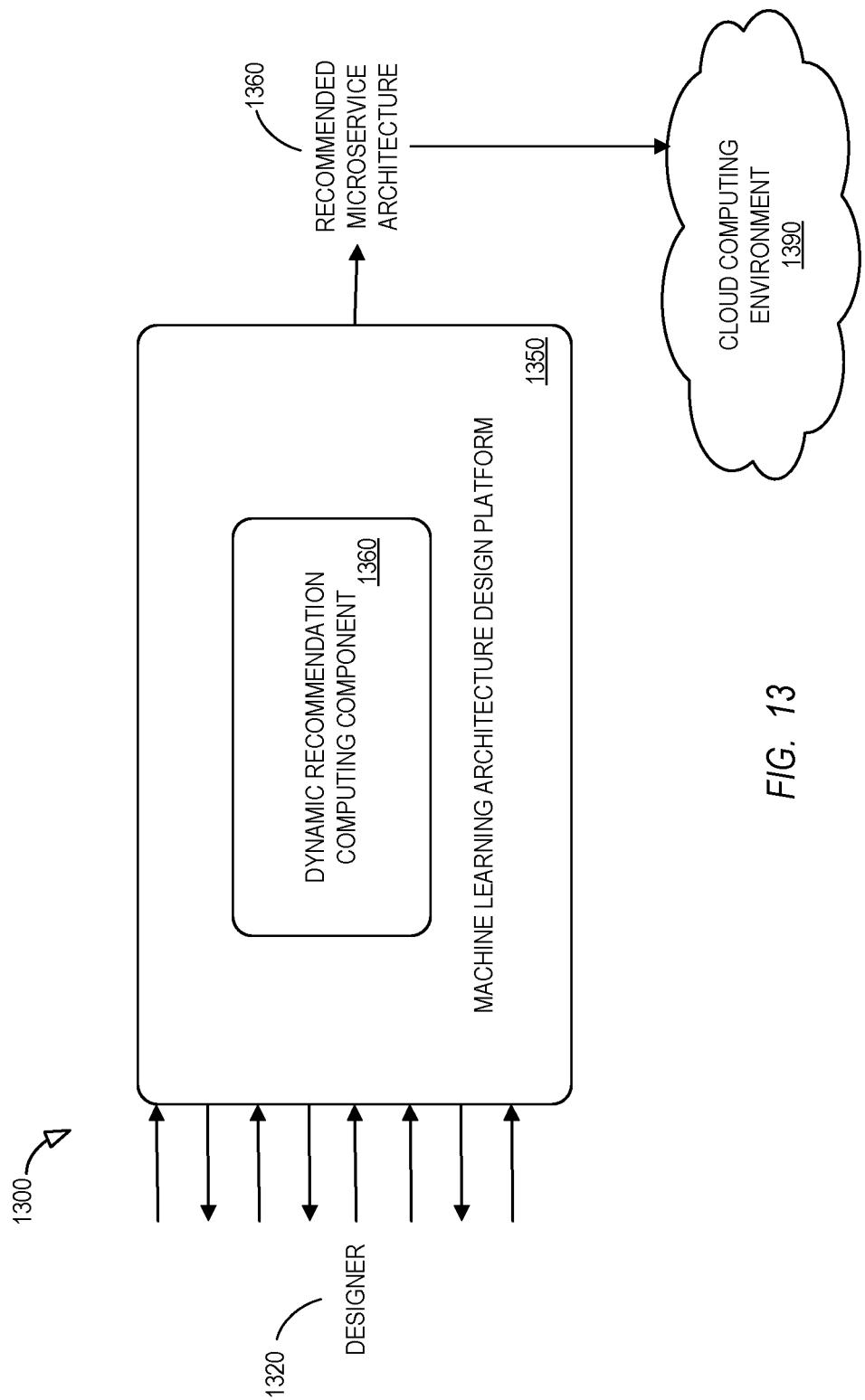
FIG. 13 is a high-level block diagram of an interactive workflow system associated with a cloud computing environment according to some embodiments.
Figure 14:
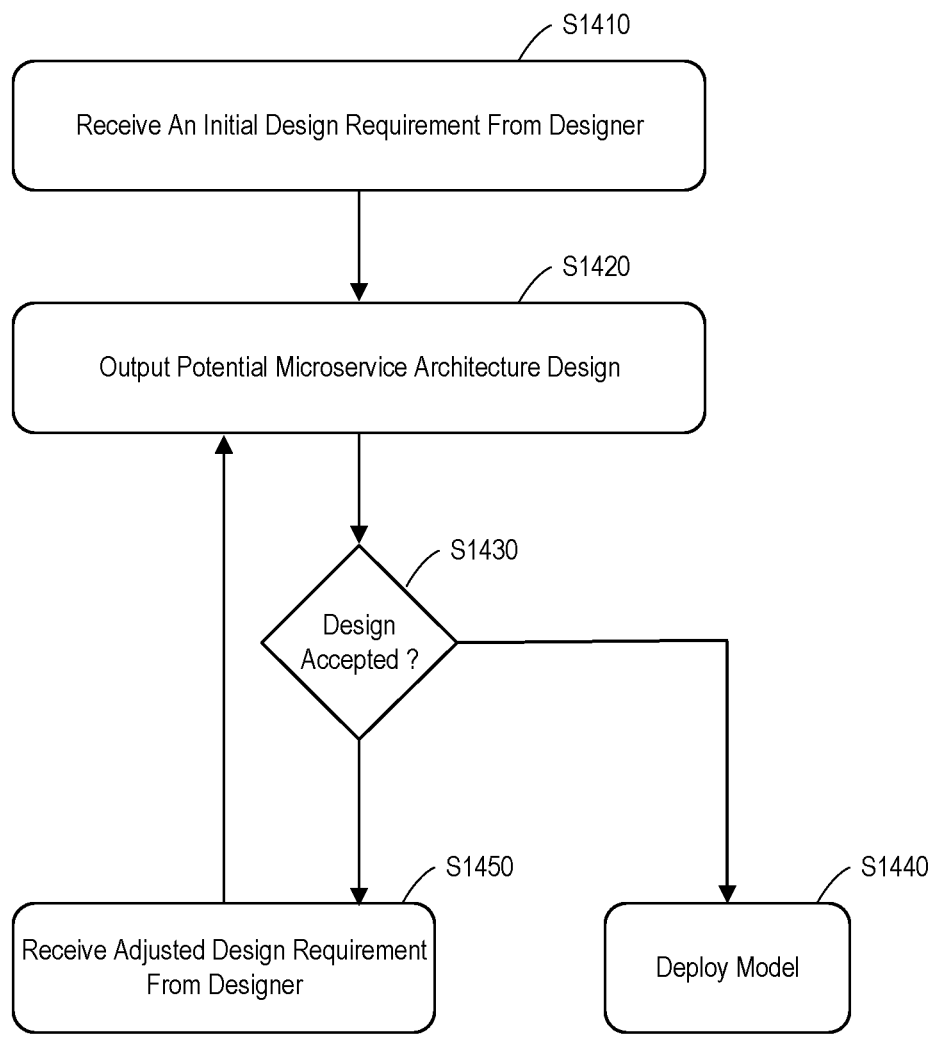
FIG. 14 is a flow diagram of an interactive workflow process in accordance with some embodiments.

FIG. 13 is a high-level block diagram of an interactive workflow system 1300 associated with a cloud computing environment 1390 according to some embodiments. As before, a machine learning architecture platform 1350 may receive input from a designer 1320 and and generate a recommended microservice architecture 1360. A dynamic recommendation computing component 1360 may interactively and iteratively interact with the designer 1320. For example, FIG. 14 is a flow diagram of an interactive workflow process in accordance with some embodiments. At 51410, a system may receive an initial design requirement from a designer. At S1420, the system may output a potential microservice architecture design. If the design is accepted by the designer at S1430, the model may be deployed at S1450. If the design is not accepted by the designer at S1430, the system may receive an adjusted design requirement from the designer at S1450 and the process continues iteratively at S1420 until an acceptable design is achieved.

Figure 15:
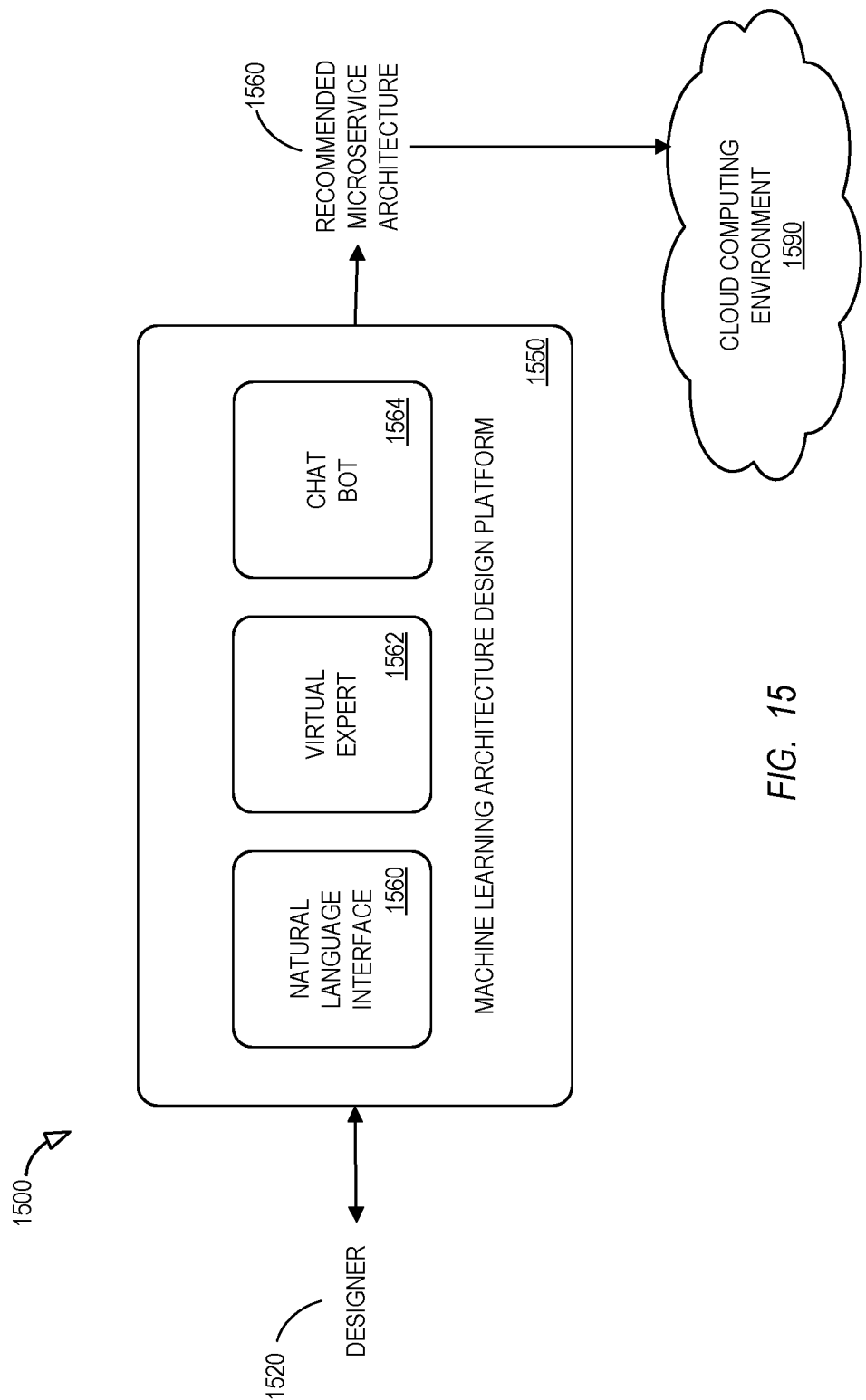
FIG. 15 is a high-level block diagram of a natural language conversation system associated with a cloud computing environment according to some embodiments.
Figure 16:
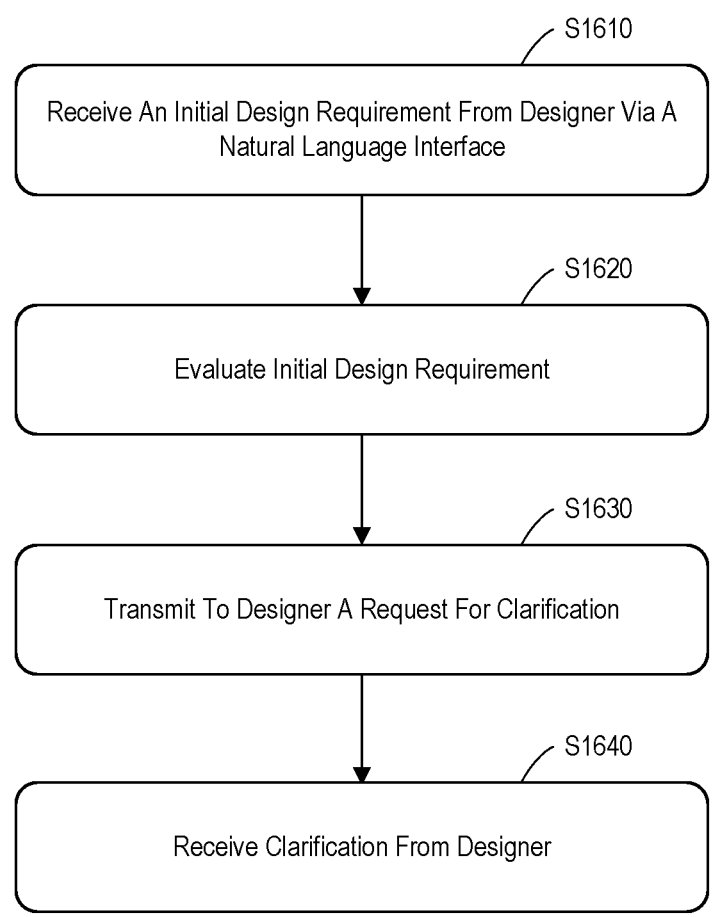
FIG. 16 is a flow diagram of a natural language conversation process in accordance with some embodiments.

FIG. 15 is a high-level block diagram of a natural language conversation system 1500 associated with a cloud computing environment 1590 according to some embodiments. As before, a machine learning architecture platform 1550 may receive input from a designer 1520 and generate a recommended microservice architecture 1560. A natural language interface 1560, a virtual expert 1562, and a chat bot 1564 may facilitate interactions with the designer 1520. For example, FIG. 16 is a flow diagram of a natural language conversation process in accordance with some embodiments. At S1610, the system may receive an initial design requirement from a designer via a natural language interface. At S1620, the system may evaluate the initial design requirement and transmit a request for clarification to the designer at S1630. At S1640, the system may receive a clarification from the designer (e.g., a more specific design requirement).

Figure 17:
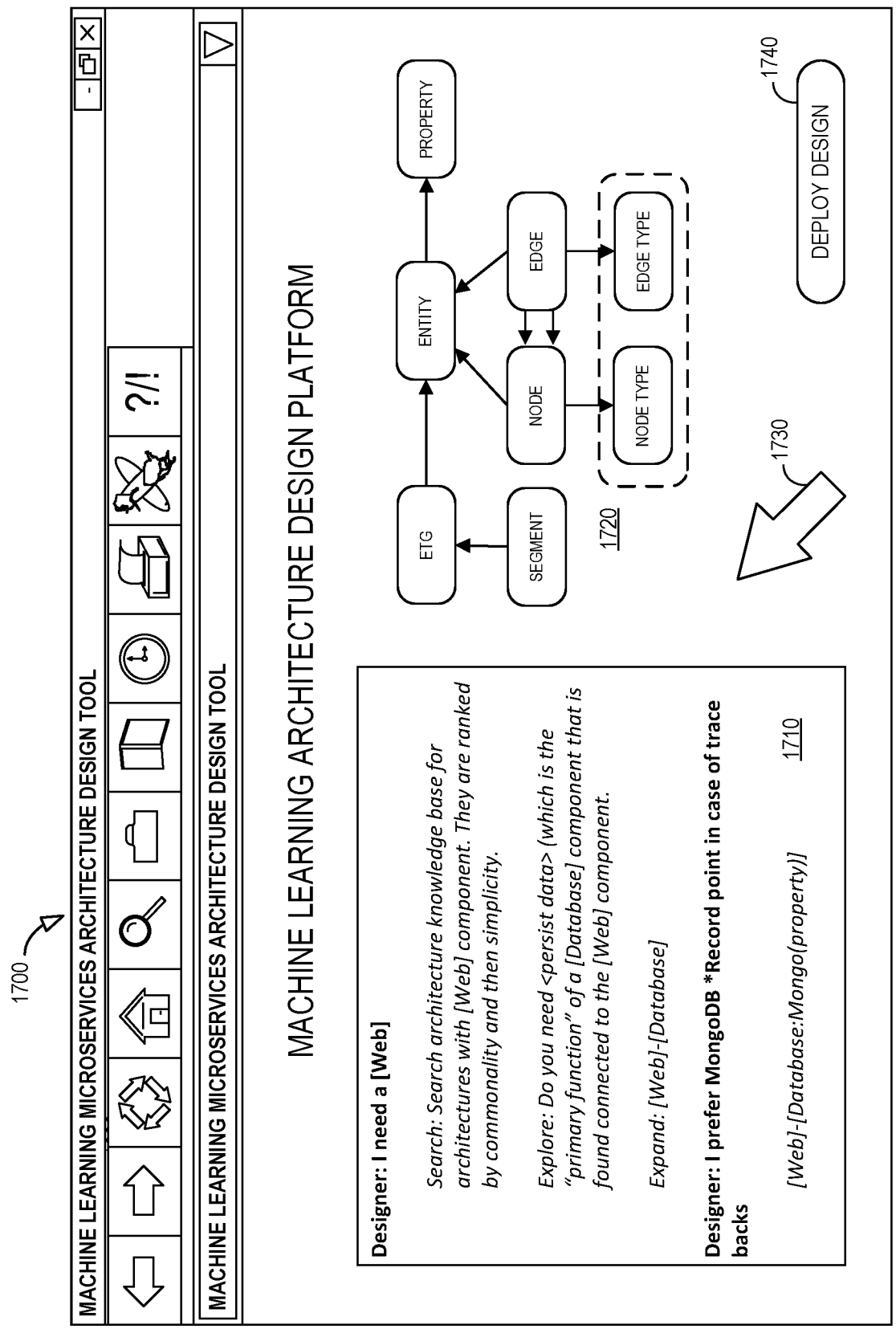
FIG. 17 is an example of a machine learning architecture design display according to some embodiments.

In this way, a designer can interact naturally with the tool to gain the benefit of AI and machine learning performed in accordance with any of the embodiments described herein. For example, FIG. 17 is an example of a machine learning architecture design display 1700 according to some embodiments. The display 1700 includes a dialog box 1710 where the designer and the tool can communicate. According to some embodiments, multiple designers may interact with the system through natural language at the same time during the same conversation. This allows local or remote designers to collaborate in design sessions. Note that the system may blend requests from multiple designers when suggesting an architecture. Moreover, the system may also monitor comments from one designer to another during a design session to better understand the context and goals of design requirements. The display 1700 also includes graphical depictions 1710 of elements of a data center (including nodes, entities, etc.). According to some embodiments, selection of an element via a touchscreen or computer mouse pointer 1730 may result in additional information being provided about that element (e.g., in a pop-up window) and/or let an operator adjust parameters for that element. Moreover, in some embodiments, selection of a "Deploy Design" icon 1430 may let an operator send the design to the cloud for execution.

When given a sufficiently large data set, the tool may automatically detect common design patterns by mining graph patterns using one of the a priori-based approaches or pattern growth approaches. Then, the system may use the extracted design patterns to guide customers through their design process. When an initial knowledge base contains only a relatively small number of samples (e.g., a few hundred templates covering vastly different scenarios), mining graph patterns may be unlikely to yield satisfactory results. On the other hand, these curated templates are assumed to reflect proven patterns for given scenarios already, so additional mining may be unnecessary. Instead of graph mining, embodiments might use a discovery process to dynamically learn about new design patterns. Throughout a design session, the system may continuously execute an evaluation function to assess the quality of the architecture. When the system finds a certain design-related decision may lead to noticeable improvements, it may record the new graph as a new design pattern. Similarly, if the system finds a design decision may cause the assessment score to drop, the graph may be recorded as a potential anti-pattern.

According to some embodiments, an expand-match-merge process may be used to dynamically discover applicable patterns from its knowledge base. For example, the process may start with a user-selected resource. The system may then search a knowledge base for possible expansions and guide the designer to further expand the graph. If the designer rejects all of the expansion proposals, the resource may be left unconnected (and the designer can add another resource to start a new expansion process).

Figure 18:
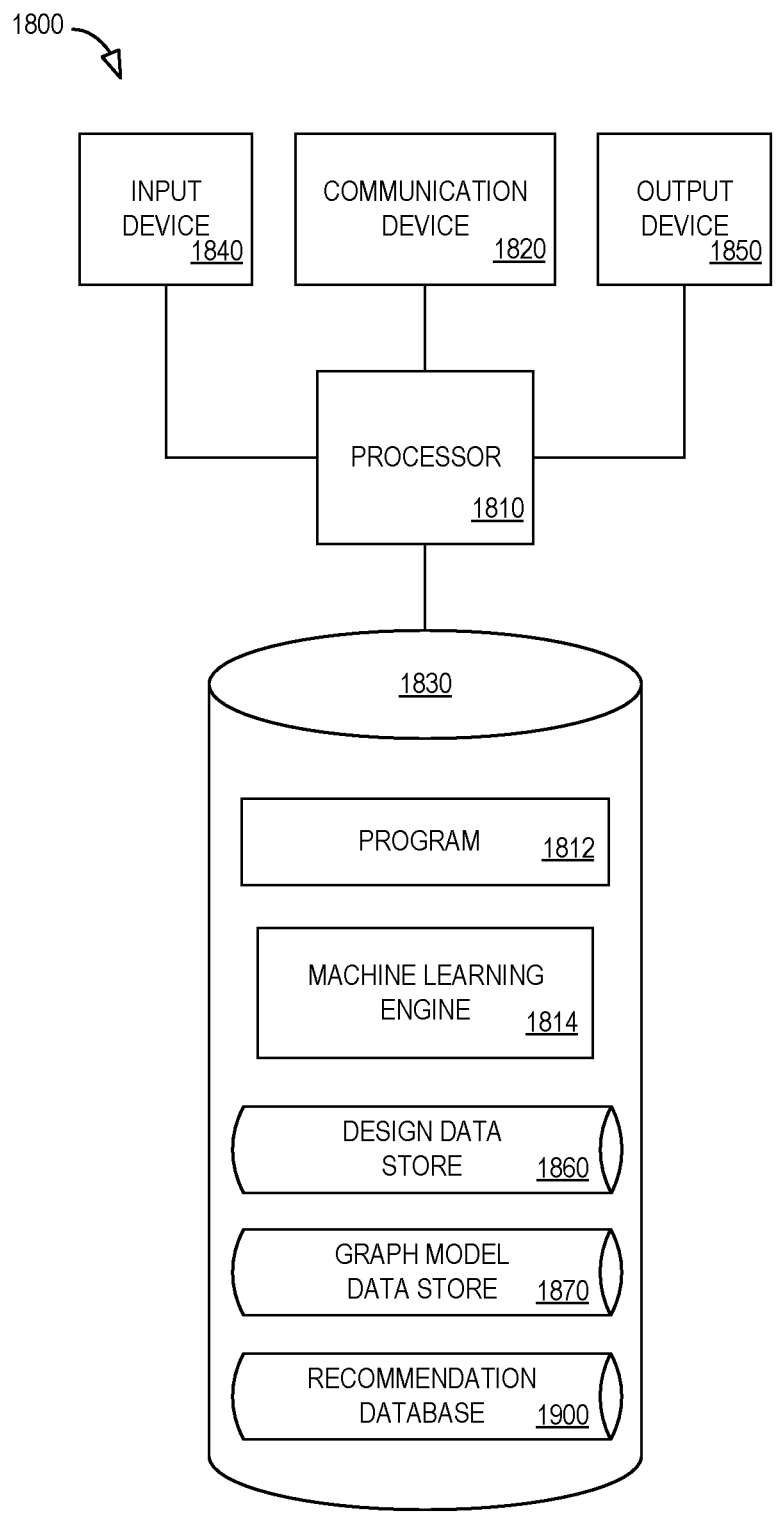
FIG. 18 illustrates a machine learning architecture design platform according to some embodiments.

The embodiments described herein may be implemented using any number of different hardware configurations. For example, FIG. 18 is a block diagram of a data center management apparatus or platform 1800 that may be, for example, associated with the system 100 of FIG. 1 or any other system described herein. The machine learning architecture design platform 1800 comprises a processor 1810, such as one or more commercially available Central Processing Units ("CPUs") in the form of one-chip microprocessors, coupled to a communication device 1860 configured to communicate via a communication network (not shown in FIG. 18). The communication device 1860 may be used to communicate, for example, with one or more designers, architects, data sources, etc. The machine learning architecture design platform 1800 further includes an input device 1840 (e.g., a computer mouse and/or keyboard to input machine learning parameters) and/an output device 1850 (e.g., a computer monitor to render a display, provide alerts, transmit recommendations, and/or create reports). According to some embodiments, a mobile device, monitoring physical system, and/or PC may be used by an operator to exchange information with the machine learning architecture design platform 1800.

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1816 and/or a machine learning engine 1814 for controlling the processor 1810. The processor 1810 performs instructions of the programs 1816, 1814, and thereby operates in accordance with any of the embodiments described herein. For example, the processor 1810 may access a microservice architecture design data store that contains existing microservice architecture designs, and a graphic abstraction computing component may automatically create existing graph models of the existing designs. The processor 1810 may then execute a machine learning algorithm to access the existing graph models and automatically detect existing design patterns. The processor 1810 may interactively and iteratively exchange information with a designer, including receipt of at least one design requirement from the designer. Based on the at least one received design requirement and the automatically detected existing design patterns, the processor 1810 may automatically construct a recommended microservice architecture for the cloud computing environment. In some embodiments, a quality assessment computing component may evaluate a potential microservice architecture design.

The programs 1816, 1814 may be stored in a compressed, uncompiled and/or encrypted format. The programs 1816, 1814 may furthermore include other program elements, such as an operating system, clipboard application, a database management system, and/or device drivers used by the processor 1810 to interface with peripheral devices.

As used herein, information may be "received" by or "transmitted" to, for example: (i) the machine learning architecture design platform 1800 from another device; or (ii) a software application or module within the machine learning architecture design platform 1800 from another software application, module, or any other source.

In some embodiments (such as the one shown in FIG. 18), the storage device 1830 further stores a design data store 1860 (e.g., containing source material for machine learning), a graph model data store 1870 (e.g., abstracted versions of the information in the design data store 1860), and a recommendation database 1900. An example of a database that might be used in connection with the machine learning architecture design platform 1800 will now be described in detail with respect to FIG. 19. Note that the databases described herein are only examples, and additional and/or different information may be stored therein. Moreover, various databases might be split or combined in accordance with any of the embodiments described herein.

Referring to FIG. 19, a table is shown that represents the recommended design database 1900 that may be stored at the machine learning architecture design platform 1800 according to some embodiments. The table may include, for example, entries identifying recommendations made by a machine learning software design tool. The table may also define fields 1902, 1904, 1906, 1908, 1910 for each of the entries. The fields 1902, 1904, 1906, 1908, 1910 may, according to some embodiments, specify: a recommendation identifier 1902, a designer identifier 1904, a graph model identifier 1906, one or more design requirements 1908, and a recommendation 1910. The recommended design database 1900 may be created and updated, for example, based on information derived from data sources, machine learning, and a designer in an iterative fashion.

The recommendation identifier 1902 might be a unique alphanumeric code associated with a particular recommendation made by the machine learning design tool. The designer identifier 1904 might identify the designer and the graph model identifier 1906 might represent an abstract version of prior or pre-existing designs (e.g., created by crawling template library). The one or more design requirements 1908 may specific how the application needs to function (e.g., the application needs to support 100 simultaneous user), and a recommendation 1910 may reflect the microservice architecture that was finally recommended by the machine learning tool.

Thus, embodiments may provide systems and methods to accurately and efficiently improve microservice architecture design. Moreover, machine learning may provide insights to help designers improve architectures.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. Some embodiments have been described with respect to microservices but note that embodiments may be generalized to apply to other componentized applications.

Embodiments described herein are solely for the purpose of illustration. Those in the art will recognize other embodiments may be practiced with modifications and alterations to that described above.

What is claimed is:

1. A system associated with microservice architecture design for a cloud computing environment, comprising:
at least one microservice architecture design data store containing existing microservice architecture designs; and
a machine learning architecture design platform, coupled to the at least one microservice architecture design data store, including:

a graphic abstraction computing component to access the existing microservice architecture designs and automatically create existing graph models of the existing microservice architecture designs, a pattern recognition computing component to execute a machine learning algorithm that accesses the existing graph models and automatically detects existing design patterns, a designer interface computing component to interactively and iteratively exchange information with a designer, and a dynamic recommendation computing component to:
receive, from the designer interface computing component, at least one design requirement, and
based on the at least one received design requirement and the automatically detected existing design patterns, automatically construct a recommended microservice architecture for the cloud computing environment.

2. The system of claim 1, wherein the at least one microservice architecture design data store is associated with at least one of: (i) a public design data store, (ii) a data store associated with the designer, (iii) a data store associated with other designers, (iv) a data store associated with the cloud computing environment, (v) a data store associated with other cloud computing environments, (vi) an architecture requirements data store, (vii) a platform-specific knowledge data store, (viii) a library of design templates, and (ix) textual design descriptions.

3. The system of claim 1, wherein the existing graph models comprise enterprise topography graphs.

4. The system of claim 3, wherein the graphic abstraction computing component executes at least one of: (i) a process to automatically acquire knowledge by crawling a plurality of data stores, (ii) a process utilizing a horizontal-scale property, (iii) a process utilizing a vertical-scale property, (iv) a process utilizing a state-feature property, (v) a process utilizing a proxy property, (vi) a process utilizing a communication pattern property, (vii) a graph generalization process, (viii) a graph specialization process, (ix) a graph substitution process, and (x) a graph acquisition process.

5. The system of claim 1, wherein the pattern recognition computing component executes at least one of: (i) a process to identify efficient patterns, and (ii) a process to identify inefficient anti-patterns.

6. The system of claim 1, wherein the designer interface computing component exchanges information with the designer via at least one of: (i) a natural language interface, (ii) a virtual expert, (iii) a chat bot, (iv) voice recognition, and (v) a video stream.

7. The system of claim 1, wherein the dynamic recommendation computing component automatically constructs a series of recommended microservice design patterns for the designer.

8. The system of claim 1, wherein the machine learning architecture design platform further includes:
a quality assessment computing component to evaluate a potential microservice architecture design via at least one of: (i) a Quality of Service ("QoS") merit analysis, (ii) a modulization analysis, (iii) a robustness analysis, (iv) a scalability analysis, and (v) a single-point-of-failure analysis.

9. The system of claim 8, wherein the quality assessment computing component further evaluate a currently deployed microservice architecture design.

10. The system of claim 1, wherein the machine learning architecture design platform utilizes at least one of: (i) decision tree learning, (ii) association rule learning, (iii) an artificial neural network, (iv) deep learning, (v) inductive logic programming, (vi) a Support Vector Machine ("SVM"), (vii) clustering, (viii) a Bayesian network, (ix) reinforcement learning, (x) representation learning, (xi) similarity and metric learning, (xii) sparse dictionary learning, and (xiii) a genetic algorithm.

11. The system of claim 1, wherein the machine learning architecture design platform is to transmit a deployable package associated with a microservice architecture design to the designer.

12. A computer-implemented method associated with microservice architecture design for a cloud computing environment, comprising:
accessing, by a machine learning architecture design platform, at least one microservice architecture design data store containing existing microservice architecture designs;
automatically creating, by a graphic abstraction computing component, existing graph models of the existing microservice architecture designs;
executing, by a pattern recognition computing component, a machine learning algorithm that accesses the existing graph models and automatically detects existing design patterns;
interactively and iteratively exchanging information, by a designer interface computing component, with a designer including a receipt of at least one design requirement from the designer; and
based on the at least one received design requirement and the automatically detected existing design patterns, automatically constructing, by a dynamic recommendation computing component, a recommended microservice architecture for the cloud computing environment.

13. The method of claim 12, wherein the at least one microservice architecture design data store is associated with at least one of: (i) a public design data store, (ii) a data store associated with the designer, (iii) a data store associated with other designers, (iv) a data store associated with the cloud computing environment, (v) a data store associated with other cloud computing environments, (vi) an architecture requirements data store, (vii) a platform-specific knowledge data store, (viii) a library of design templates, and (ix) textual design descriptions.

14. The method of claim 12, wherein the existing graph models comprise enterprise topography graphs.

15. The method of claim 14, wherein the graphic abstraction computing component executes at least one of: (i) a process to automatically acquire knowledge by crawling a plurality of data stores, (ii) a process utilizing a horizontal-scale property, (iii) a process utilizing a vertical-scale property, (iv) a process utilizing a state-feature property, (v) a process utilizing a proxy property, (vi) a process utilizing a communication pattern property, (vii) a graph generalization process, (viii) a graph specialization process, (ix) a graph substitution process, and (x) a graph acquisition process.

16. The method of claim 12, wherein the pattern recognition computing component executes at least one of: (i) a process to identify efficient patterns, and (ii) a process to identify inefficient anti-patterns.

17. A non-transient, computer-readable medium storing instructions to be executed by a processor to perform a method associated with microservice architecture design for a cloud computing environment, the method comprising:

accessing, by a machine learning architecture design platform, at least one microservice architecture design data store containing existing microservice architecture designs;

automatically creating, by a graphic abstraction computing component, existing graph models of the existing microservice architecture designs;

executing, by a pattern recognition computing component, a machine learning algorithm that accesses the existing graph models and automatically detects existing design patterns;

interactively and iteratively exchanging information, by a designer interface computing component, with a designer including a receipt of at least one design requirement from the designer; and based on the at least one received design requirement and the automatically detected existing design patterns, automatically constructing, by a dynamic recommendation computing component, a recommended microservice architecture for the cloud computing environment.

18. The medium of claim 17, wherein the designer interface computing component exchanges information with the designer via at least one of: (i) a natural language interface, (ii) a virtual expert, (iii) a chat bot, (iv) voice recognition, and (v) a video stream.

19. The medium of claim 17, wherein the dynamic recommendation computing component automatically constructs a series of recommended microservice design patterns for the designer.

20. The medium of claim 17, further comprising:

evaluating, by a quality assessment computing component, a potential microservice architecture design via at least one of: (i) a Quality of Service ("QoS") merit analysis, (ii) a modulization analysis, (iii) a robustness analysis, (iv) a scalability analysis, and (v) a single-point-of-failure analysis.

* * * * *